(12) United States Patent
Yamasaki et al.

(10) Patent No.: US 7,641,802 B2
(45) Date of Patent: Jan. 5, 2010

(54) WASTEWATER TREATMENT METHOD AND WASTEWATER TREATMENT EQUIPMENT

(75) Inventors: Kazuyuki Yamasaki, Hiroshima (JP); Kazumi Chuhjoh, Kagawa-ken (JP); Kohji Ohoka, Yamatokooriyama (JP); Keichiro Uda, Kyoto-fu (JP)

(73) Assignee: Sharp Kabushiki Kaisha, Osaka (JP)

( * ) Notice: Subject to any disclaimer, the term of this patent is extended or adjusted under 35 U.S.C. 154(b) by 129 days.

(21) Appl. No.: 11/816,985

(22) PCT Filed: Jan. 31, 2006

(86) PCT No.: PCT/JP2006/301551
§ 371 (c)(1),
(2), (4) Date: Aug. 23, 2007

(87) PCT Pub. No.: WO2006/095509
PCT Pub. Date: Sep. 14, 2006

(65) Prior Publication Data
US 2009/0032460 A1    Feb. 5, 2009

(30) Foreign Application Priority Data
Mar. 4, 2005    (JP)    ............... 2005-060613

(51) Int. Cl.
*C02F 1/42* (2006.01)
(52) U.S. Cl. .................. 210/748; 210/763; 210/205; 210/220
(58) Field of Classification Search .............. 210/205, 210/220, 748, 763
See application file for complete search history.

(56) References Cited

U.S. PATENT DOCUMENTS 5,314,644 A    5/1994    Michelsen et al.

(Continued)

FOREIGN PATENT DOCUMENTS

JP    51-124666    10/1976

(Continued)

OTHER PUBLICATIONS

U.S. Appl. No. 11/816,880, filed Aug. 22, 2007, entitled "Wastewater Treatment Equipment and Method of Wastewater Treatment".

(Continued)

*Primary Examiner*—Chester T Barry
(74) *Attorney, Agent, or Firm*—Nixon & Vanderhye P.C.

(57) ABSTRACT

In a micronanobubble reaction vessel 3 of wastewater treatment equipment, wastewater containing organic matter is treated with micronanobubbles. Thereafter, the wastewater is introduced into an aeration tank 7. Part of organic matter in the wastewater is oxidized in the micronanobubble reaction vessel 3 by micronanobubble treatment prior to treatment with activity of microorganisms enhanced in the aeration tank 7. After organic matter load is thus reduced, the treatment water is introduced into the aeration tank 7, in which microorganisms exist in high concentration due to submerged membranes 17, so that the organic matter in wastewater can be effectively treated. This makes it possible to accomplish miniaturization of the aeration tank 7, reduction in scale of the whole equipment and therefore reduction in initial cost. Also, a photocatalyst tank 22 is provided downstream of the aeration tank 7, so that a minute amount of organic matter unaffected by the microbial treatment alone can be oxidized at high-level by using a photocatalyst plate 24.

15 Claims, 5 Drawing Sheets

U.S. PATENT DOCUMENTS

| | | | |
|---|---|---|---|
| 6,209,855 | B1 | 4/2001 | Glassford |
| 6,830,690 | B2 | 12/2004 | Schmid |
| 2003/0209501 | A1* | 11/2003 | Leung .................. 210/748 |
| 2005/0045557 | A1* | 3/2005 | Daigger et al. .......... 210/605 |
| 2005/0072718 | A1* | 4/2005 | Lacy et al. ............ 210/96.1 |
| 2006/0054205 | A1 | 3/2006 | Yabe et al. |
| 2009/0020474 | A1 | 1/2009 | Yamasaki et al. |

FOREIGN PATENT DOCUMENTS

| | | |
|---|---|---|
| JP | 52-129677 | 10/1977 |
| JP | 62-197197 | 8/1987 |
| JP | 04-083594 | 3/1992 |
| JP | 07-195091 | 8/1995 |
| JP | 10-047649 | 2/1998 |
| JP | 10-128377 | 5/1998 |
| JP | 11-047738 | 2/1999 |
| JP | 11-057772 | 3/1999 |
| JP | 11-151486 | 6/1999 |
| JP | 11-333490 | 12/1999 |
| JP | 2000-167555 | 6/2000 |
| JP | 3095620 | 8/2000 |
| JP | 2000-271577 | 10/2000 |
| JP | 2000-279975 | 10/2000 |
| JP | 2000-308900 | 11/2000 |
| JP | 2001-038348 | 2/2001 |
| JP | 2001-198584 | 7/2001 |
| JP | 2002-143885 | 5/2002 |
| JP | 2003-033625 | 2/2003 |
| JP | 2003-071256 | 3/2003 |
| JP | 2003-094086 | 4/2003 |
| JP | 3467671 | 9/2003 |
| JP | 2003-284946 | 10/2003 |
| JP | 2003-334548 | 11/2003 |
| JP | 2004-121962 | 4/2004 |
| JP | 2004-290735 | 10/2004 |

OTHER PUBLICATIONS

Kukizaki et al., "Generation of Monodisperse Nanometer Bubbles Through a Porous Membrane and Control of Bubble Sizes," pp. 654-659 (2004).

Takagi et al., "Behavior of Rising Bubbles in Water Containing Surfactant," pp. 16-23 (2003).

U.S. Office Action mailed Jan. 28, 2009 in related U.S. Appl. No. 11/816,880.

U.S. Appl. No. 11/816,867, filed Aug. 22, 2007, entitled "Waste Gas/Wastewater Treatment Equipment and Method of Treating Waste Gas/Wastewater".

International Search Report for PCT/JP2006/301551 mailed May 2, 2006.

English translation of the International Preliminary Report on Patentability mailed Sep. 20, 2007 in corresponding PCT application PCT/JP2006/301551.

* cited by examiner

Fig.5A

TOTAL ORGANIC CARBON CONCENTRATION IN
WASTEWATER CONTAINING ORGANIC MATTER : 800ppm

| TANK NAME | RETAINING PERIOD (DAY) | TIMING (DAY) 0.5   1   1.5   2 |
|---|---|---|
| ADJUSTMENT TANK | 0.5 | — (0.5) |
| MICRONANOBUBBLE REACTION VESSEL | 0.2 | — (~0.7) |
| AERATION TANK | 1 | ———— (0.7–1.7) |
| PHOTOCATALYST TANK | 0.3 | — (~2) |

Fig.5B

TOTAL ORGANIC CARBON CONCENTRATION IN
WASTEWATER CONTAINING ORGANIC MATTER : 1600ppm

| TANK NAME | RETAINING PERIOD (DAY) | TIMING (DAY) 0.5  1  1.5  2  2.5  3 |
|---|---|---|
| ADJUSTMENT TANK | 0.5 | — (0.5) |
| MICRONANOBUBBLE REACTION VESSEL | 0.2 | — (~0.7) |
| AERATION TANK | 2 | ———— (0.7–2.7) |
| PHOTOCATALYST TANK | 0.3 | — (~3) |

US 7,641,802 B2

WASTEWATER TREATMENT METHOD AND WASTEWATER TREATMENT EQUIPMENT

This application is the U.S. national phase of International Application No. PCT/JP2006/301551, filed Jan. 31, 2006, which designated the U.S. and claims priority to Japanese Patent Application No. 2005-060613, filed Mar. 4, 2005, the entire contents of each of which are hereby incorporated by reference.

TECHNICAL FIELD

The present invention relates to wastewater treatment method and wastewater treatment equipment for treating wastewater containing organic matter. More specifically, the present invention relates to wastewater treatment equipment and wastewater treatment method allowing high-concentration microbial treatment with use of a submerged membrane, micronanobubble treatment and photocalytic treatment and also allowing downsizing and increase in quality of treated water.

BACKGROUND ART

Conventionally, general microbial treatment systems have an aeration tank with a large capacity, which makes it difficult for factories having smaller installation areas to install the aeration tank. This gives rise to a demand for wastewater treatment methods and wastewater treatment equipment which has a small installation area therefor as well as good performance.

The high-concentration microbial treatment system with use of a submerged membrane suffers a problem of reduction in filtered water amount due to clogging of the submerged membrane as time passes. This gives rise to a demand for a method which makes it possible to effectively clean oil and fat content on the surface of the submerged membrane that causes clogging, even when the clogging of the submerged membrane occurs.

In the case of systems involving only the high-concentration microbial treatment, or in the case of requiring further advanced treatment, treatment of activated carbon adsorption is sometimes added. This causes a problem of higher running cost due to replacement of activated carbon after adsorption of organic matter or the like. This gives rise to a demand for a method which can effectively be cleaned oil and fat content on the surface of the submerged membrane that causes clogging, even when the clogging of the submerged membrane occurs.

As another prior art, JP2004-121962A has disclosed a treatment method and a treatment device with use of nanobubbles.

This prior art utilizes characteristics of nanobubbles such as decrease in buoyancy, increase in surface area, increase in surface activity, generation of local high pressure fields, a surface active property and an antiseptic property which are attained by achievement of electrostatic polarization. More specifically, this prior art has disclosed that the correlation among these characteristics shows a fouling component adsorption function, a substance surface high-speed cleaning function and an antiseptic function, so that it becomes possible to clean various substances with high performance and low environmental load so as to purify contaminated water.

As yet another prior art, JP 2003-334548A has disclosed a nanobubble generation method.

In the nanobubble generation method according to this prior art, there is provided with (1) a step for gasifying part of liquid by decomposition in liquids, (2) a step for applying ultrasonic waves in liquids, or (3) a step for gasifying part of liquid by decomposition and a step for applying ultrasonic waves.

Both these two prior arts have disclosed purification of contaminated water by using nanobubbles or removal of dirt on the surface of solids by using nanobubbles. However, the two prior arts fail to disclose any technology for enhancing efficiency in treatment and quality of treated water by increasing the activity of microorganisms when treating wastewater containing organic matter with use of microorganisms.

DISCLOSURE OF INVENTION

Subjects which the Invention is to Solve

It is a primary object of the present invention to provide wastewater treatment method and wastewater treatment equipment allowing increase in treatment efficiency of wastewater containing organic matter while achieving downsizing and reduction in running cost.

Means for Solving the Subjects

In order to achieve the above object, the present invention provide a wastewater treatment method, comprising:

a micronanobubble treatment step for treating wastewater containing organic matter with micronanobubble;

a microbial treatment step for applying microbial treatment with use of a submerged membrane to treatment water obtained by treating the wastewater containing organic matter in the micronanobubble treatment step; and a photocalytic step for applying photocalytic treatment to treatment water after the microbial treatment step.

In the wastewater treatment method of the present invention, the treatment water containing organic matter is subjected to pretreatment with micronanobubbles in the micronanobubble treatment step. Then, the treatment water is subjected to microbial treatment in the microbial treatment step. Consequently, the effects of the pretreatment with the micronanobubbles make it possible to reduce organic load or to increase activity of microorganisms in the subsequent microbial treatment as well as to downsize the equipment for microbial treatment.

Further, applying photocalytic treatment to the treatment water after subjected to the microbial treatment in the microbial treatment step allows photocalytic treatment of a minute amount of residual organic matter contained in the treatment water, so that advanced treatment beyond the limit of the treatment by the microbial treatment can be achieved.

The present invention also provides wastewater treatment equipments comprising:

a micronanobubble reaction vessel for receiving wastewater containing organic matter and treating the wastewater containing organic matter with micronanobubbles;

an aeration tank for receiving treatment water from the micronanobubble reaction vessel and applying microbial treatment to the treatment water with a submerged membrane included in the aeration tank; and a photocatalyst tank for receiving treatment water from the aeration tank and applying photocalytic treatment to the treatment water.

In the wastewater treatment equipment of this embodiment, the wastewater containing organic matter is treated with use of micronanobubble in the micronanobubble reaction vessel, and thereafter introduced into the aeration tank having a submerged membrane. In this embodiment, therefore, prior to the microbial treatment in the aeration tank, the wastewater containing organic matter is treated with micronanobubbles in the micronanobubble reaction vessel. Consequently, the organic matter in wastewater is oxidized by micronanobubbles to reduce organic matter load, and thereafter the treatment water is introduced into the aeration tank in which microorganisms are present in high concentration by means of the submerged membrane, so that treatment of organic matter is effectively accomplished. This allows miniaturization of the aeration tank, reduction in scale of the whole equipment and reduction in initial cost. In photocatalyst tank provided downstream of the aeration tank, oxidation treatment using photocatalyst makes it possible to perform high-level oxidation of a minute amount of organic matter which has been unaffected by general microbial treatment alone.

In one embodiment of the invention, the wastewater treatment equipment further comprises an adjustment tank provided upstream of the micronanobubble reaction vessel for receiving the wastewater containing organic matter and adjusting quality and quantity of the wastewater containing organic matter, wherein the micronanobubble reaction vessel receives wastewater containing organic matter with quality and quantity adjusted in the adjustment tank.

In the wastewater treatment equipment of this embodiment, the micronanobubble reaction vessel receives wastewater containing organic matter with quality and quantity adjusted in the adjustment tank, which allows efficient oxidation of the organic matter by micronanobubble.

In one embodiment of the invention, the micronanobubble reaction vessel has a micronanobubble generator, and a water conveyance section for conveying treatment water from the aeration tank to the micronanobubble generator through the submerged membrane.

In the wastewater treatment equipment of this embodiment, the water conveyance section conveys treatment water from the aeration tank to the micronanobubble generator included in the micronanobubble reaction vessel through the submerged membrane. In other words, the treatment water (water containing electrolyte) is conveyed to the micronanobubble generator from the aeration tank in which becomes the concentration of microorganisms becomes high by means of the submerged membrane. Consequently, the micronanobubble generator can stably supply extremely fine bubbles in the micronanobubble reaction vessel.

In one embodiment of the invention, the aeration tank has a micronanobubble cleaning section for generating micronanobubbles to clean the submerged membrane.

In the wastewater treatment equipment, the micronanobubble cleaning section can clean the submerged membrane by using the generated micronanobubbles, so that oil and fat contents causing the clogging of the submerged membrane can effectively be washed away.

In one embodiment of the invention, the aeration tank has an air diffusion pipe for discharging air to the submerged membrane to clean the submerged membrane, and the submerged membrane is cleaned with mixed bubbles composed of micronanobubbles generated by the micronanobubble cleaning section and air discharged from the air diffusion pipe.

According to the wastewater treatment equipment in this embodiment, the submerged membrane in the aeration tank can be cleaned by two kinds of mixed bubbles: micronanobubbles generated by the micronanobubble cleaning section and large air bubbles discharged from the air diffusion pipe. Therefore, the synergistic effects of these two kinds of bubbles can be obtained by exerting the respective capabilities of these two kinds of bubbles. Thereby more reliable cleaning of the submerged membrane can be achieved. More particularly, air bubbles from the air diffusion pipe move toward the submerged membrane in such a way that micronanobubbles excellent in cleaning effect can be guided to the submerged membrane.

In one embodiment of the invention, the air diffusion pipe is placed below the submerged membrane while the micronanobubble cleaning section is placed between the submerged membrane and the air diffusion pipe, and there are provided: a first guide mounted on the air diffusion pipe for guiding air discharged from the air diffusion pipe to the micronanobubble cleaning section; and a second guide mounted on the submerged membrane for guiding micronanobubbles generated by the micronanobubble cleaning section and air discharged from the air diffusion pipe to the submerged membrane.

According to the effluent treatment device in this embodiment, the first and second guides can laconically bring the micro nano bubbles, which are generated in the micro nano bubble cleaning section, and air bubbles, which are generated by the air diffusion pipe, into contact with the submerged membrane. This allows more reliable cleaning of the submerged membrane.

In one embodiment of the invention, the aeration tank has a plurality of submerged membranes placed vertically in two or more rows.

According to the wastewater treatment equipment in this embodiment, a plurality of the submerged membranes are placed in two or more rows in vertical direction in the aeration tank. This makes it possible to reduce the installation floor space for the aeration tank, thereby making it possible to provide space saving equipment.

In one embodiment of the invention, the photocatalyst tank has an ultraviolet irradiation section; and a photocatalyst plate which comes into contact with the treatment water and which includes a sputtered thin film irradiated with ultraviolet light from the ultraviolet irradiation section.

According to the wastewater treatment equipment in this embodiment, the ultraviolet irradiation section applies ultraviolet light to the photocatalyst plate so as to be able to increase the photocalytic effect of the photocatalyst plate. Moreover, the sputtered thin film included in the photocatalyst plate can be made into a close-grained thin film with high hardness as a photocatalyst. Therefore, the sputtered thin film is free from wear and detachment from the photocatalyst plate even when it is impacted by intense water flow. The ultraviolet irradiation section is preferably placed in a location away from the treatment water. The ultraviolet irradiation section may be constituted of a mercury lamp and the like.

In one embodiment of the invention, the photocatalyst tank has a light emitting diode lamp; and a photocatalyst plate which comes into contact with the treatment water and which includes a sputtered thin film irradiated with light from the light emitting diode lamp.

According to the wastewater treatment equipment in this embodiment, applying light beams from the light emitting diode lamp, which is in noncontact with the treatment water, to the photocatalyst plate can enhance the photocalytic effect of the photocatalyst plate. Moreover, the light emitting diode lamp does not contain mercury unlike ultraviolet lamps, and therefore the light emitting diode lamp is environmentally safe. The light emitting diode lamp is preferably placed in a location away from the treatment water.

In one embodiment of the invention, the photocatalyst plate includes the sputtered thin film and a substrate which is made of either glass or quart.

According to the wastewater treatment equipment in this embodiment, the photocatalyst plate is made of glass or quart, and therefore is inexpensive and easy to manufacture.

In one embodiment of the invention, the photocatalyst tank has a micronanobubble generator.

According to this embodiment, the photocatalyst tank can increase the efficiency of contact between treatment water and the photocatalyst plate by generating micronanobubbles with use of the micronanobubble generator. Furthermore, it is possible to oxidize residual organic matter in treatment water in a short time by using two oxidations, oxidation with use of micronanobubbles and oxidation with photocatalyst.

In one embodiment of the invention, the aeration tank receives treatment water subjected to biological treatment or sludge generated after biological treatment.

According to the wastewater treatment equipment in this embodiment, the aeration tank receives treatment water subjected to biological treatment or sludge generated after the biological treatment. This makes it possible to reinforce the activity of microorganisms in the aeration tank. More particularly, culturing high concentrations of microorganisms requires minerals in the treatment water subjected to biological treatment or in the sludge generated after the biological treatment. Shortage of the minerals causes poor activity of microorganisms. Moreover, treatment water rich in electrolyte can be obtained by introducing the treatment water subjected to biological treatment or the sludge resulting from the biological treatment, which are sources of electrolyte ions, into the aeration tank.

In one embodiment of the invention, the photocatalyst tank is structured to have a transparent outer wall, and the ultraviolet irradiation section is placed around the transparent outer wall.

According to the wastewater treatment equipment in this embodiment, the photocatalyst tank has a transparent outer wall, so that outside light incoming through the transparent outer wall can increase the photocalytic action of the photocatalyst plate and thereby enhance the treatment efficiency of treatment water through the photocalytic action. Making the entire surfaces of the outer wall transparent allows the light incoming from upper, lower and side surfaces, so that the photocalytic action is further enhanced.

EFFECT OF THE INVENTION

According to the wastewater treatment method in this invention, the treatment water is subjected to the micronanobubble treatment step, in which the organic matter in the wastewater containing organic matter is pretreated with micronanobubbles, and then the treatment water is subjected to microbial treatment in the microbial treatment step. Therefore, the pretreatment with use of the micronanobubbles increases the activity of microorganisms, and thereby it is possible to reduce organic matter load and downsize the device for microbial treatment. Further, the treatment water is subjected to photocalytic treatment after the microbial treatment in the microbial treatment step, and thereby it becomes possible to treat a minute amount of residual organic matter. This makes it possible to perform an advanced treatment beyond the limit of the treatment by the microbial treatment.

Therefore, according to the wastewater treatment method in the present invention, it becomes possible to enhance treatment efficiency of wastewater containing organic matter and to achieve reduction in scale of the wastewater treatment equipment as well as reduction in running cost.

BRIEF DESCRIPTION OF THE DRAWINGS

FIG. 5A shows a time chart in the case where total organic carbon concentration of wastewater containing organic matter in the first to fourth embodiments is 800 ppm; and FIG. 5B shows a time chart in the case where total organic carbon concentration of wastewater containing organic matter in the first to fourth embodiments is 1600 ppm.

Figure 1:
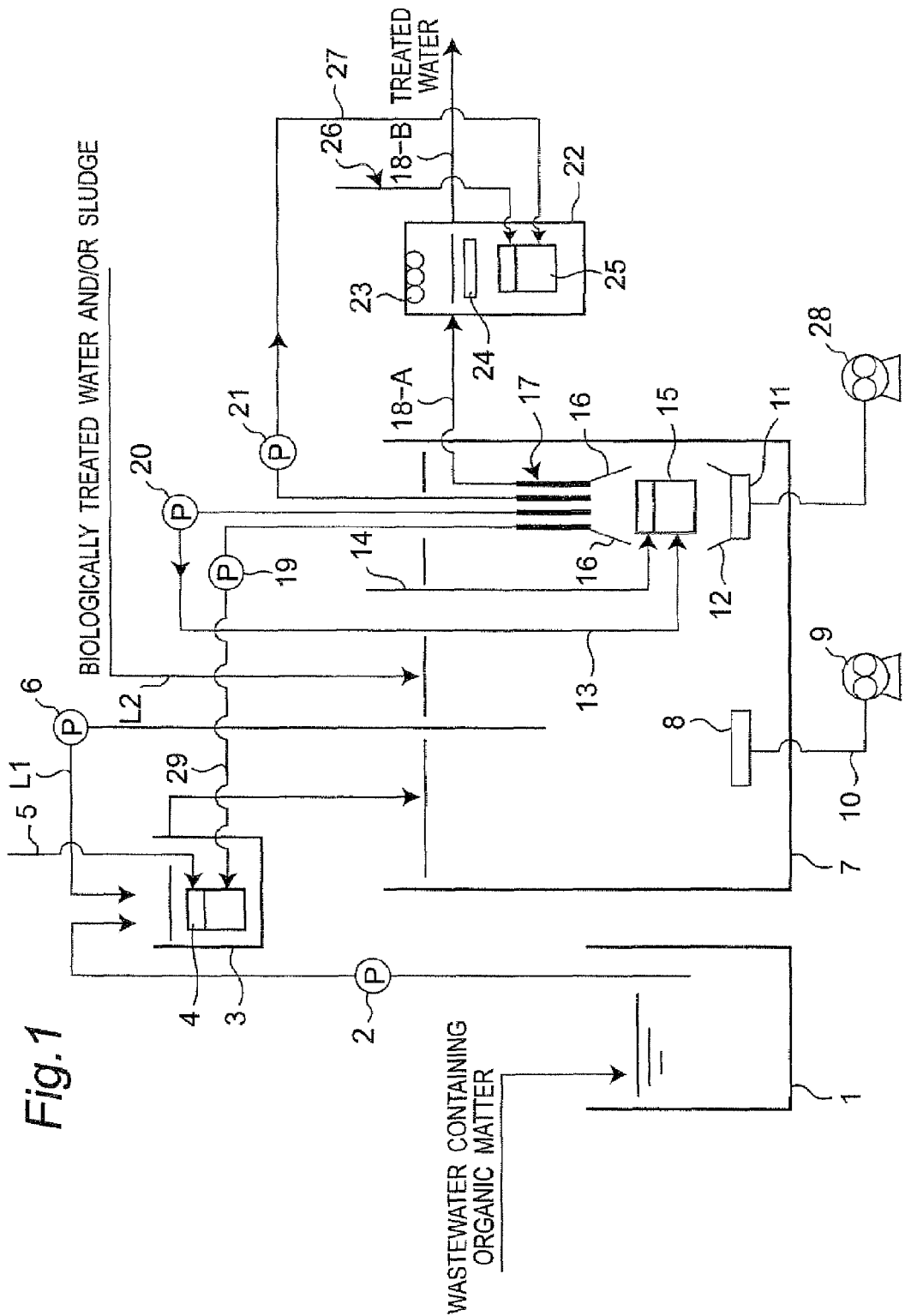
FIG. 1 shows a schematic view of an effluent treatment device in a first embodiment of the present invention.

SYMBOLS 1 adjustment tank
2 adjustment tank pump
3 micronanobubble reaction vessel
4 micronanobubble generator
5,14,26 air suction pipe
6 circulating pump
7,7N,7V,7Z aeration tank
8,11 diffusion pipe
9 intermittent operation blower
10 air pipe
12 diffusion pipe cover
13,27,29 water pipe
15 micronanobubble generator
16 submerged membrane cover
17 submerged membrane
18 gravity pipe
19,20,21 water pump
22 photocatalyst tank
23 ultraviolet lamp
24 photocatalyst plate
25 micronanobubble generator
28 blower
30 polyvinylidene chloride filling
31 separation plate
32A ascending water flow
32B descending water flow

BEST MODE FOR CARRYING OUT THE INVENTION

Hereinbelow, the present invention will be described in detail in conjunction with embodiments with reference to the drawings.

First Embodiment

FIG. 1 shows a schematic view of wastewater treatment equipment in a first embodiment of the present invention. In the first embodiment, the wastewater treatment equipment has an adjustment tank 1, a micronanobubble reaction vessel 3, an aeration tank 7 and a photocatalyst tank 22.

Wastewater containing organic matter is introduced into the adjustment tank 1, where the quantity and the quality of the wastewater containing organic matter are adjusted. The wastewater introduced into the adjustment tank 1 may include various kinds of wastewater containing organic matter such as wastewater from food factories and organic alkali wastewater from semiconductor factories, for example. Domestic wastewater is also included in the wastewater containing organic matter since domestic wastewater contains organic matter. The wastewater containing organic matter is adjusted as to its quantity and quality in the adjustment tank 1, and is then introduced into the micronanobubble reaction vessel 3 by an adjustment tank pump 2 as treatment water.

A micronanobubble generator 4 is placed inside of the micronanobubble reaction vessel 3. An air suction pipe 5 and a water pipe 29 are connected to the micronanobubble generator 4. Through the air suction pipe 5, air is introduced into the micronanobubble generator 4. Through the water pipe 29, treatment water is fed into the micronanobubble generator 4, where the treatment water is conveyed by a water pump 19 from a submerged membrane 17 placed inside the aeration tank 7. In this way, the micronanobubble generator 4 generates micronanobubbles.

The water pipe 29 and the water pump 19 constitute a water conveyance section. The micronanobubble generator 4 is not limited by manufacturers, but any micronanobubble generator available in the market can be used therefor. For a specific example, it is possible to adopt a micronanobubble generator made by Nanoplanet Research Institute Corporation. It is also possible as other available products to adopt micronanobubble water generating apparatuses made by Aura Tec Corporation, Shigenkaihatsu Corporation, or made by Seika Corporation.

In the micronanobubble reaction vessel 3, the organic matter contained in the wastewater is partially oxidized by micronanobubbles. Then, the treatment water partially oxidized is introduced into the aeration tank 7.

The aeration tank 7 is equipped with a circulating pump 6. The circulating pump 6 introduces sludge into the micronanobubble reaction vessel 3 through a circulating pipe L1, wherein the sludge includes the treatment water in the aeration tank 7. The sludge in the micronanobubble reaction vessel 3 is treated with use of micronanobubbles generated by the micronanobubble generator 4, and then returned to the aeration tank 7.

In other words, the sludge including the treatment water is circulated between the aeration tank 7 and the micronanobubble reaction vessel 3 by the circulating pump 6. During circulation of the treatment water with use of the circulating pump 6, oxygen is supplied to the treatment water to oxidize the treatment water by micronanobubbles. Particularly, it has been found out that nanobubbles stay in water for ever to increase dissolved oxygen concentration.

There are three kinds of babble as follows, and description is given thereof.

(i) general bubbles rise in water to end up bursting on the surface and disappear.

(ii) micro bubbles, which are fine bubbles with a diameter of 50 microns (μm) or less, shrink in water and end up disappearing (i.e. completely dissolving).

(iii) nano bubbles are smaller than micro bubbles and have a diameter of several hundred nm or less (e.g., diameter of 100 to 200 nm), are said to be able to keep on existing in water permanently.

Thus, the micronanobubbles are bubbles which are formed by mixture of the microbubbles and the nanobubbles.

The water is circulated by the circulating pump 6 from the submerged membrane 17 in the aeration tank 7 through the water pipe 29 to the micronanobubble reaction vessel 3, so that the circulated water is introduced into the micronanobubble generator 4 in the micronanobubble reaction vessel 3. Consequently, the circulated water is supplied with oxygen by using micronanobubbles. Nanobubbles in the micronanobubble remain in treatment water inside the aeration tank 7 for a long period of time, so that the dissolved oxygen in the aeration tank 7 is maintained for a long period of time.

In conventional aeration tanks where oxygen supply by micronanobubbles is not available, an aerating blower operates for 24 hours. In the present embodiment, on the other hand, the aeration tank 7 is intermittently aerated by the air bubbles discharged from a diffusion pipe 8, to which the air is supplied through an air pipe 10 by a blower 9 which is intermittently operated. The intermittent operation by the intermittent operation blower 9 can save energy in comparison with continuous operation.

As shown in FIG. 1, the aeration tank 7 is equipped with three water pumps 19, 20, 21 each connected to the submerged membrane 17.

As described before, the water pump 19 conveys treatment water from the submerged membrane 17 to the micronanobubble reaction vessel 3. The water pump 20 conveys treatment water from the submerged membrane 17 to a micronanobubble generator 15 for cleaning the submerged membrane 17 through a water pipe 13. An air suction pipe 14 is connected to the micronanobubble generator 15, so that air is introduced into the micronanobubble generator 15 through the air suction pipe 14.

The water pump 21 conveys treatment water from the submerged membrane 17 to a micronanobubble generator 25 through a water pipe 27, where micronanobubble generator 25 is placed in the photocatalyst tank 22 provided downstream of the aeration tank 7. An air suction pipe 26 is connected to the micronanobubble generator 25, so that air is introduced from the air suction pipe 26 into the micronanobubble generator 25.

The submerged membrane 17 is also equipped with a submerged membrane cover 16 as a second guide. When the air is discharged and ascends from an air diffusion pipe 11, which is placed below the micronanobubble generator 15, the submerged membrane cover 16 plays a role of guiding super fine micronanobubbles, together with the air discharged from the air diffusion pipe 11, to the submerged membrane 17 so as to effectively contact with the submerged membrane 17.

The air diffusion pipe 11 connected to a blower 28 is also equipped with an air diffusion pipe cover 12 as a first guide. The air diffusion pipe cover 12 plays a role of efficiently guiding the air discharged from the air diffusion pipe 11 to the micronanobubble generator 15. The blower 28, which supplies air to the air diffusion pipe 11, continuously operates for 24 hours. The reason of the continuous operation is that air cleaning of the submerged membrane 17 needs 24 hours' operation.

The operating time of the micronanobubble generator 15 may be determined in association with the clogging state of the submerged membrane 17. More specifically, in the case where treatment water contains a large amount of oil and fat contents, the operating time of the micronanobubble generator 15 generally becomes relatively long. The air supplied from the blower 28 to the air diffusion pipe 11 is discharged from the air diffusion pipe 11 and cleans the surface of the submerged membrane 17. Mixed bubbles, which are composed of micronanobubbles and the air discharged from the air diffusion pipe 11, have higher effect of cleaning the submerged membrane 17.

Treatment water, which is subjected to biological treatment or sludge generated by biological treatment, is introduced into the aeration tank 7 through a pipe L2. The biologically treatment water or the biologically treated sludge includes microelements such as phosphorus, potassium, calcium and magnesium. The microelements promote s activity of all the microorganisms in the aeration tank 7. Unless the microelements are sufficiently contained in the water, the treatment unstable because microorganisms stay inactive in high-concentration microbial treatment, in particular, with use of the submerged membrane 17 within the aeration tank 7. The aeration tank 7 is operated with a microbial concentration of 10,000 ppm or higher in terms of MLSS (Mixed Liquor Suspended Solid) concentration. The treatment water comes out of the submerged membrane 17, and is introduced into the photocatalyst tank 22 through a gravity pipe 18-A. The treatment water is introduced through the gravity pipe 18-A by using water head difference.

The photocatalyst tank 22 is equipped with an ultraviolet lamp 23 as an ultraviolet irradiation section, which lamp is placed on the uppermost section of the tank in such a way that treatment water does not reach the ultraviolet lamp 23. Inside the photocatalyst tank 22, the micronanobubble generator 25 is also placed. A photocatalyst plate 24 is placed between the ultraviolet lamp 23 and the micronanobubble generator 25. The photocatalyst plate 24 contacts with treatment water, whereas the ultraviolet lamp 23 does not contact with the treatment water.

In the photocatalyst tank 22, the treatment water is mixed and agitated with the photocatalyst of the photocatalyst plate 24 by using the micronanobubbles generated by the micronanobubble generator 25, and also the treatment water is oxidized by the micronanobubbles. The photocatalyst plate 24 has specifically been manufactured by forming a sputtered thin film on a glass plate by using the sputtering method. Generally, the ultraviolet lamp 23 contains harmful mercury. Therefore, an environmentally-safe light emitting diode lamp may be employed in place of the ultraviolet lamp 23. The water fed to the micronanobubble generator 25 is the treatment water supplied through the water pipe 27 by the water pump 21 which is connected to the submerged membrane 17.

Then, treated water is obtained from an outlet of the photocatalyst tank 22. According to the wastewater treatment equipment in the first embodiment, wastewater containing organic matter is treated with micronanobubbles in the micronanobubble reaction vessel 3, and then introduced into the aeration tank 7 having the submerged membrane 17. This allows the treatment to be carried out in the sate that the activity of microorganisms is enhanced by micronanobubbles. At the same time, the wastewater containing organic matter is treated with micronanobubbles in the micronanobubble reaction vessel 3 prior to microbial treatment in the aeration tank 7. Therefore, it becomes possible to achieve miniaturization of the aeration tank 7, reduction in scale of the whole equipment and reduction in initial cost. Moreover, the organic matter contained in wastewater is oxidized with micronanobubbles. Thereby, the organic matter load is reduced. Thereafter, the treatment water is introduced into the aeration tank 7 where microorganisms are present in high concentration due to submerged membrane 17. Thereby, treatment of the organic matter is effectively accomplished. In photocatalyst tank 22 provided downstream of the aeration tank 7, it is possible to perform high-level oxidation treatment of organic matter by oxidation with use of the photocatalyst. This oxidation treatment can treat such a minute amount of organic matter as the microbial treatment alone cannot treat.

According to the present embodiment, it is possible to enhance the efficiency of contact between the treatment water and the photocatalyst plate 24 in the photocatalyst tank 22, by using micronanobubbles generated by the micronanobubble generator 25. Furthermore, it is possible to oxidize residual organic matter in treatment water in a short period of time by both the oxidation with micronanobubbles and the oxidation with photocatalyst.

According to the first embodiment, therefore, the treatment efficiency of wastewater containing organic matter is not only enhanced, but also reduction in scale of the wastewater treatment equipment and reduction in running cost can be achieved.

In the first embodiment, the water pump 19 and the water pipe 29, which constitute a water conveyance section, convey the treatment water from the aeration tank 7 through the submerged membrane 17 to the micronanobubble generator 4 provided in the micronanobubble reaction vessel 3. In other words, the treatment water, which contains electrolyte and is treated by the submerged membrane, is conveyed from the aeration tank 7 to the micronanobubble generator 4. The aeration tank 7 is a high-concentration biological treatment device utilizing the submerged membrane 17. Thus, the micronanobubble generator 4 can stably supply extremely fine air bubbles in the micronanobubble reaction vessel 3.

Second Embodiment

Figure 2:
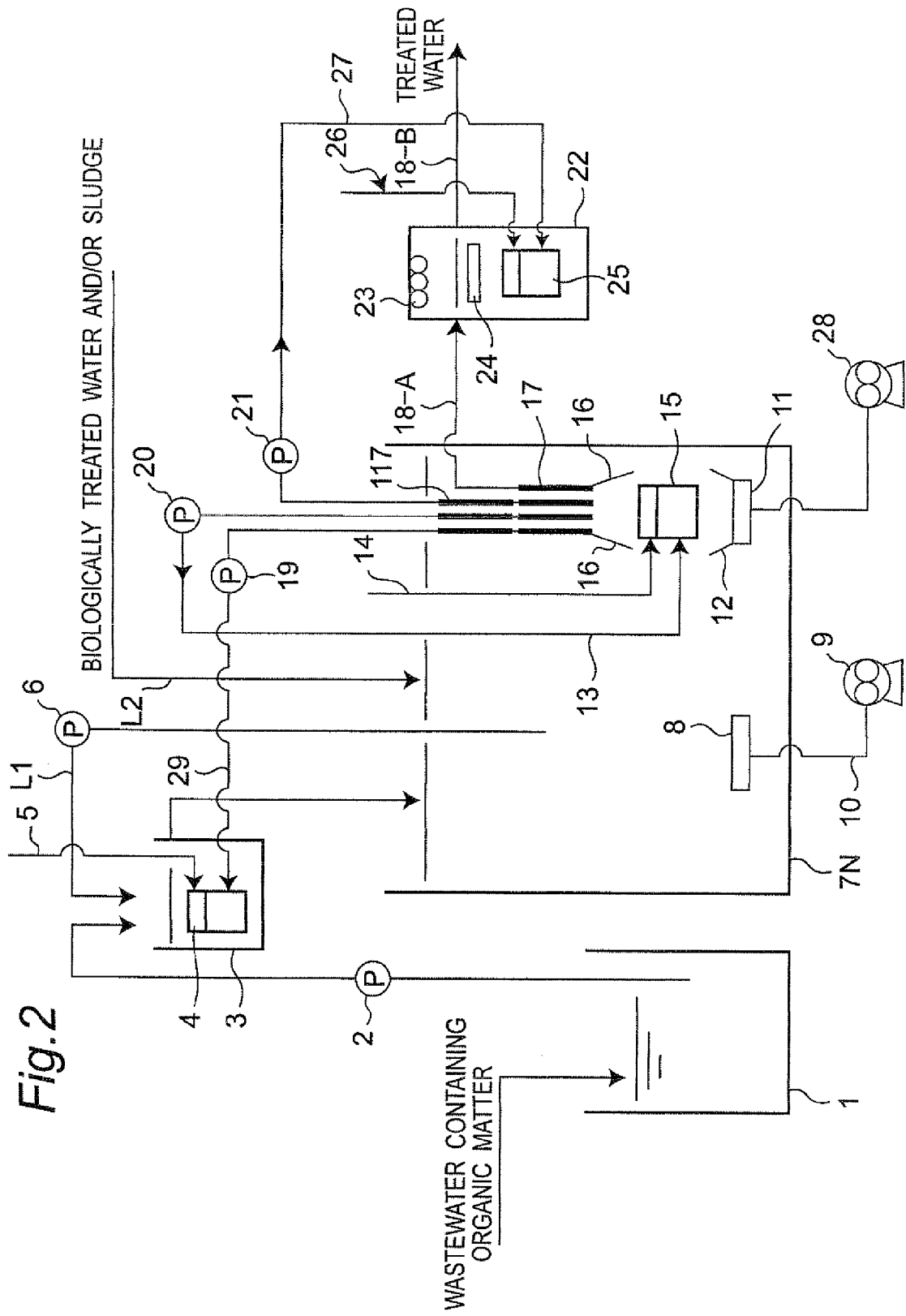
FIG. 2 shows a schematic view of an effluent treatment device in a second embodiment of the present invention.

FIG. 2 shows wastewater treatment equipment in a second embodiment of the present invention. The second embodiment is different from the first embodiment only in the point that an aeration tank 7N is equipped with other submerged membranes 117 placed above the submerged membrane 17. Consequently, in the second embodiment, the component parts identical to those in the first embodiment are designated by identical reference numerals, and description will be omitted except the component parts different from the first embodiment.

In the second embodiment, as shown in FIG. 2, the submerged membrane 117 is placed above the submerged membrane 17 in such a way that two submerged membranes 17 and 117 are placed three-dimensionally. This allows effectively three-dimensional utilization of the micronanobubbles and cleaning air when they ascend along the submerged membranes 17 and 117, without increasing the installation floor space for the aeration tank 7.

Third Embodiment

Figure 3:
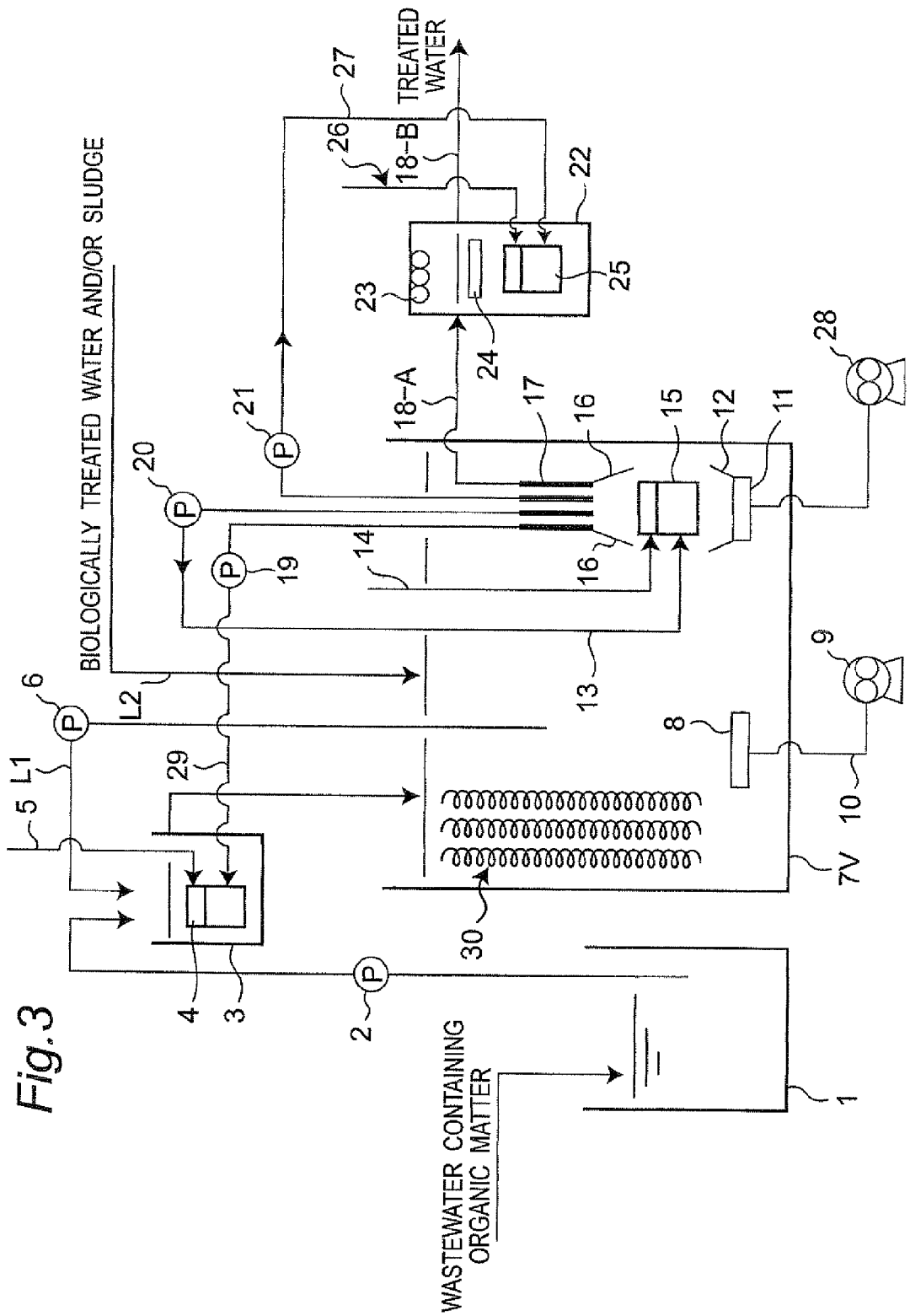
FIG. 3 shows a schematic view of an effluent treatment device in a third embodiment of the present invention.

FIG. 3 shows wastewater treatment equipment in a third embodiment of the present invention. The third embodiment is different from the aforementioned first embodiment only in the point that an aeration tank 7V is filled with a polyvinylidene chloride filling 30. Consequently, in the third embodiment, the component parts identical to those in the first embodiment are designated by identical reference numerals, and description will be omitted except the component parts different from the first embodiment.

In the third embodiment, since the aeration tank 7V is filled with polyvinylidene chloride filling 30, the whole aeration tank 7V has higher microbial concentration on an average than the aeration tank without the filling 30. In addition, microorganisms attach to the polyvinylidene chloride filling 30 and proliferate thereon. Therefore, the microorganisms are more stabilized, and also the capability to treat organic matter in the wastewater containing organic matter is enhanced, compared with the aeration tank without the filling.

It is preferable that the polyvinylidene chloride filling 30 is placed entirely in the tank 7V. In such a case, the concentration of overall microorganism becomes high in the aeration tank 7V.

In the third embodiment, microorganisms proliferate on the polyvinylidene chloride filling 30 as time proceeds starting from an initial run. The microorganism concentration becomes 30,000 ppm or more on the surface of the polyvinylidene chloride filling 30, which contributes to increase in treatment efficiency of organic matter. The polyvinylidene chloride filling 30 is made of vinylidene chloride. Vinylidene chloride is solid and resistant to chemical substances, so that it can be used semipermanently. For the polyvinylidene chloride filling 30, the products are available under the product name such as Biocode, Ling-Lace, BioMultiLeaf and Bio-Module. Any of them may be selected depending on the properties of wastewater. The third embodiment may be combined with the second embodiment.

Fourth Embodiment

Figure 4:
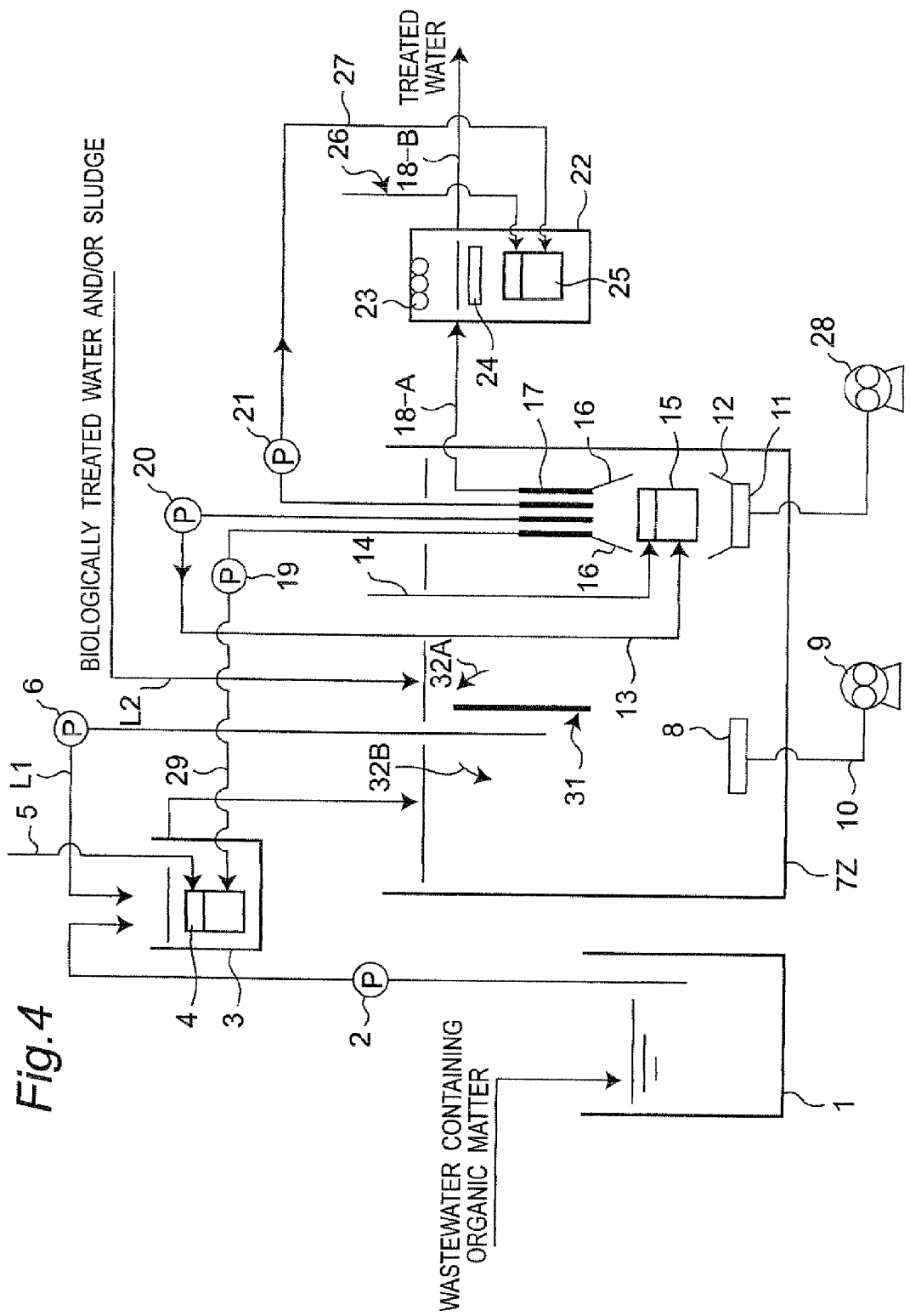
FIG. 4 shows a schematic view of an effluent treatment device in a fourth embodiment of the present invention.

FIG. 4 shows wastewater treatment equipment in a fourth embodiment of the present invention. The fourth embodiment is different from the aforementioned first embodiment only in the point that a separation plate 31 extending in a vertical direction is placed in the vicinity of approximately the center of an aeration tank 7Z. Consequently, in the fourth embodiment, the component parts identical to those in the first embodiment are designated by identical reference numerals, and description will be omitted except the component parts different from the first embodiment.

In the fourth embodiment, the air supplied by the blower 28 and discharged from the air diffusion pipe 11 generates an ascending water flow 32A in the aeration tank 7Z. The ascending water flow 32A moves beyond the separation plate 31, which is positioned approximately in the center, to the opposite side of the air diffusion pipe 11, where it becomes a descending water flow 32B. This provides sufficient agitation in the aeration tank 7Z, so that microbial decomposition of the organic matter in treatment water is promoted. The fourth embodiment may be combined with the aforementioned second and third embodiments.

Experimental Example

There was experimental equipment having a configuration identical to that of the wastewater treatment equipment in the first embodiment shown in FIG. 1. The capacities of the adjustment tank 1, the micronanobubble reaction vessel 3, and the aeration tank 7 were 50, 20 and 200 liters, respectively in the experimental equipment. Microorganisms were cultured for two months to have a microbial concentration of 14,000 ppm in the experimental equipment. Wastewater containing organic matter discharged from a factory is used for this experiment, wherein the wastewater has an organic matter concentration of 860 ppm as measured in TOC (Total Organic Carbon). This wastewater was continuously introduced into the adjustment tank 1. Thereafter, one month elapsed and the water quality was stabilized. Then, TOC of wastewater obtained from the outlet port of the gravity pipe 18-B was measured, and the result of measurement was 12 ppm.

FIG. 5A shows an example of a time chart in the first to fourth embodiments in the case where the wastewater containing organic matter has TOC of 800 ppm. FIG. 5B shows an example of a time chart in the first to fourth embodiments in the case where the wastewater containing organic matter has TOC of 1,600 ppm. Moreover, in the first to fourth embodiments, making the outer wall of the photocatalyst tank 22 transparent allows outside light incoming through the transparent outer wall to increase the photocalytic action of the photocatalyst plate 24. This makes it possible to enhance the treatment efficiency of treatment water through the photocalytic action. Particularly, making the entire surfaces of the outer wall transparent allows the light incoming from upper, lower and side surfaces to further enhance the photocalytic action.

The invention claimed is:

1. A wastewater treatment method, comprising:
   a micronanobubble treatment step for treating wastewater containing organic matter with micronanobubble;
   a microbial treatment step for applying microbial treatment with use of a submerged membrane to treatment water obtained by treating the wastewater containing organic matter in the micronanobubble treatment step; and
   a photocatalytic step for applying photocatalytic treatment to treatment water after the microbial treatment step.

2. A semi-continuous wastewater treatment method comprising
   an adjustment treatment of wastewater containing organic matter to produce an adjusted wastewater,
   treating the adjusted wastewater with micronanobubbles in a micronanobubble reaction vessel in the presence of recycled sludge from a downstream aeration treatment, to produce a micronanobubble reaction product,
   treating the micronanobubble reaction product to the aeration treatment in an aeration tank in the presence of separately added biologically treated water or sludge, and micronanobubbles, said aeration tank containing a submerged membrane and a microbubble generator and a micronanobubble generator which clean the submerged membrane, the aeration treatment producing an aerated product, and
   treating the aerated product to a photocatalytic treatment process in a photocatalytic tank in the presence of micronanobubbles to produce a photocatalytically treated product,
   said method being conducted in a semi-continuous manner such that the adjustment treatment is not conducted during the aeration treatment and the photocatalytic treatment process, and the adjusted wastewater is not being treated with micronanobubbles during the photocatalytic treatment process.

3. Wastewater treatment equipment, comprising:
   a micronanobubble reaction vessel constructed and arranged to receive wastewater containing organic matter and to treat the wastewater containing organic matter with micronanobubbles, said micronanobubble reaction vessel containing a micronanobubble generator;
   an aeration tank in fluid communication with the micronanobubble reaction vessel, said aeration tank being constructed and arranged to receive treatment water from the micronanobubble reaction vessel, said aeration tank being constructed and arranged to apply aerated microbial treatment to the treatment water with a membrane included in the aeration tank which is submerged during operation of the equipment, the aeration tank being constructed and arranged to receive at least one of biologically treated water or sludge, and the aeration tank being constructed and arranged to supply liquid circulation from the aeration tank to the micronanobubble reaction vessel; and
   a photocatalyst tank in fluid communication with the aeration tank, the photocatalyst tank being constructed and arranged to receive treatment water from the aeration tank and to apply a photocatalytic treatment to the treatment water, the photocatalyst tank containing a micronanobubble generator.

4. The wastewater treatment equipment according to claim 3, comprising
an adjustment tank provided in fluid communication and upstream of the micronanobubble reaction vessel, the adjustment tank being constructed and arranged to receive wastewater containing organic matter.

5. The wastewater treatment equipment according to claim 3, further comprising fluid communication from the aeration tank
to the micronanobubble generator of the micronanobubble reaction vessel through the membrane of the aeration tank.

6. The wastewater treatment equipment according to claim 3, wherein the aeration tank further comprises a micronanobubble generator which is constructed and arranged to be submerged during operation of the equipment and to clean the membrane during operation of the equipment.

7. The wastewater treatment equipment according to claim 6,
wherein the aeration tank has an air diffusion pipe for discharging air to the membrane to clean the membrane during operation of the equipment, and
the membrane is constructed and arranged to be cleaned with mixed bubbles composed of micronanobubbles generated by the micronanobubble cleaning section and air discharged from the air diffusion pipe during operation of the equipment.

8. The wastewater treatment equipment according to claim 7,
wherein the air diffusion pipe is constructed and arranged below the membrane while the micronanobubble cleaning section is constructed and arranged between the membrane and the air diffusion pipe, and
wherein there is provided in the aeration tank a first guide mounted on the air diffusion pipe which is constructed and arranged to guide air discharged from the air diffusion pipe to the micronanobubble generator during operation of the equipment; and
there is provided in the aeration tank a second guide mounted on the membrane for guiding micronanobubbles generated by the micronanobubble generator and air discharged from the air diffusion pipe to the membrane submerged during operation of the equipment.

9. The wastewater treatment equipment according to claim 3,
wherein the aeration tank is constructed and arranged with a plurality of membranes placed vertically in two or more rows and which are submerged during operation of the equipment.

10. The wastewater treatment equipment according to claim 3,
wherein the photocatalyst tank has:
an ultraviolet irradiation section; and
a photocatalyst plate, the photocatalyst plate being constructed and arranged to be in contact with the treatment water during operation of the equipment, the photocatalyst plate containing a sputtered thin film and the photocatalyst plate is constructed and arranged so as to be irradiated with ultraviolet light from the ultraviolet irradiation section during operation of the equipment.

11. The wastewater treatment equipment according to claim 3,
wherein the photocatalyst tank has:
a light emitting diode lamp; and
a photocatalyst plate, the photocatalyst plate being constructed and arranged to be in contact with the treatment water during operation of the equipment, the photocatalyst plate containing a sputtered thin film and the photocatalyst plate is constructed and arranged so as to be irradiated with light from the light emitting diode lamp during operation of the equipment.

12. The wastewater treatment equipment according to claim 10,
wherein the photocatalyst plate includes the sputtered thin film and a substrate which is made of either glass or quartz.

13. The wastewater treatment equipment according to claim 11,
wherein the photocatalyst plate includes the sputtered thin film and a substrate, and
the substrate is made of either glass or quartz.

14. The wastewater treatment equipment according to claim 10,
wherein the photocatalyst tank has a transparent outer wall, and the ultraviolet irradiation section is constructed and arranged around the transparent outer wall.

15. The wastewater treatment equipment according to claim 11,
wherein the photocatalyst tank has a transparent outer wall, and an ultraviolet irradiation section is constructed and arranged around the transparent outer wall.

* * * * *